June 16, 1959    A. R. BONE ET AL    2,890,650
APPARATUS FOR OPERATING ON SECTIONAL TAG MATERIAL
Filed March 11, 1955    17 Sheets-Sheet 1

Inventors
Arnold R. Bone
Donald D. Sloan
by Roberts, Cushman & Grover
Att'ys.

June 16, 1959 A. R. BONE ET AL 2,890,650
APPARATUS FOR OPERATING ON SECTIONAL TAG MATERIAL
Filed March 11, 1955 17 Sheets-Sheet 2

Inventors
Arnold R. Bone
Donald D. Sloan
by Roberts, Cushman & Grover
Att'ys.

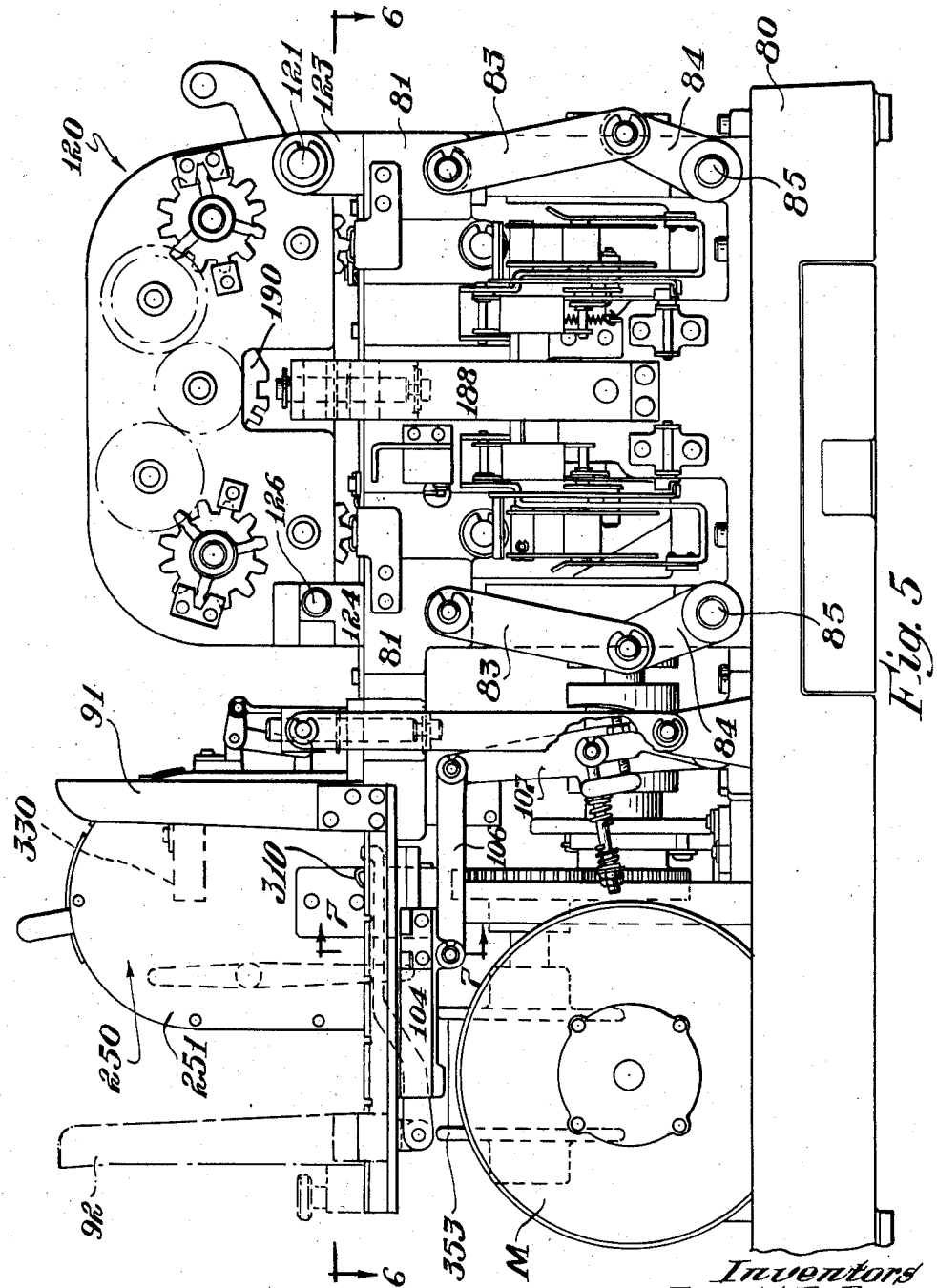

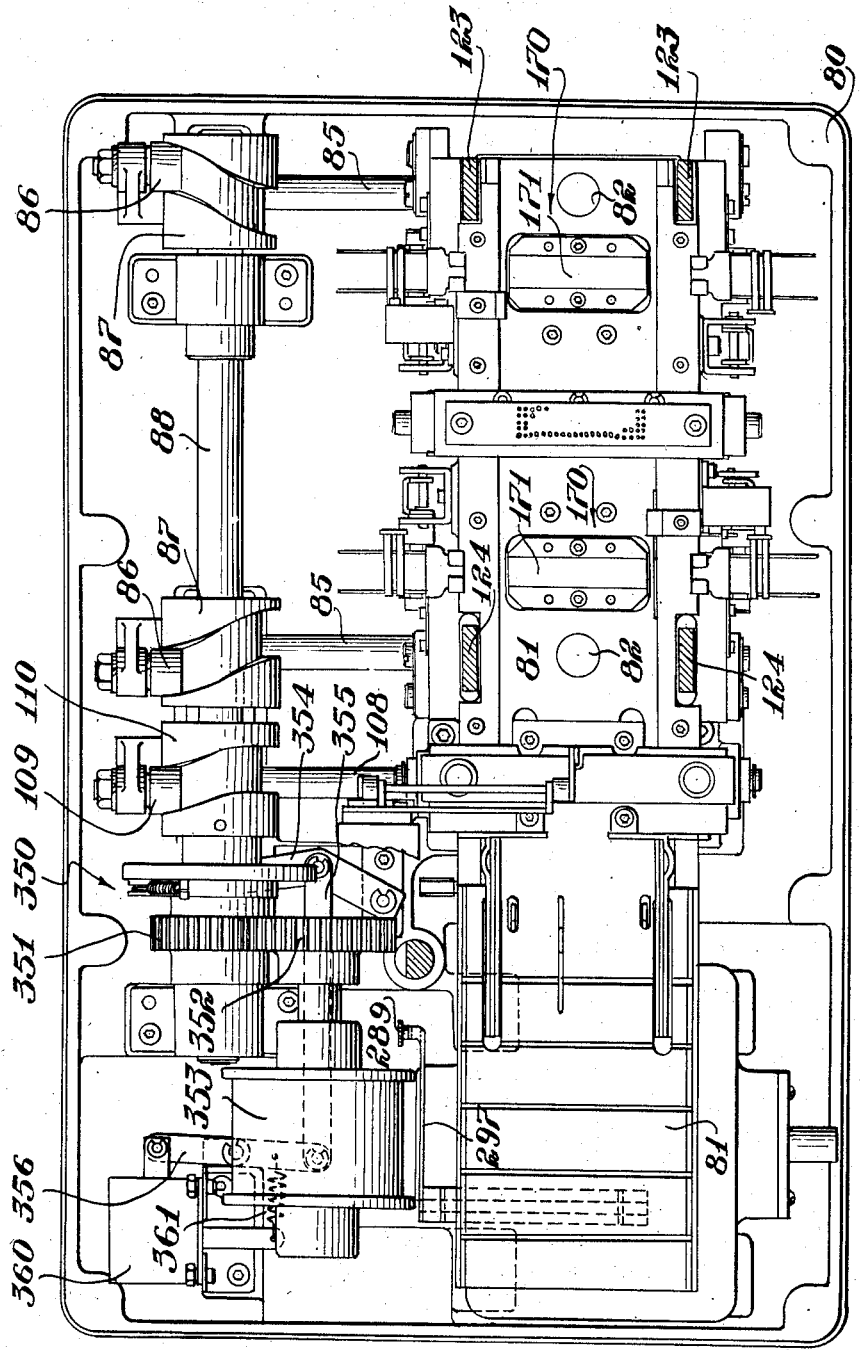

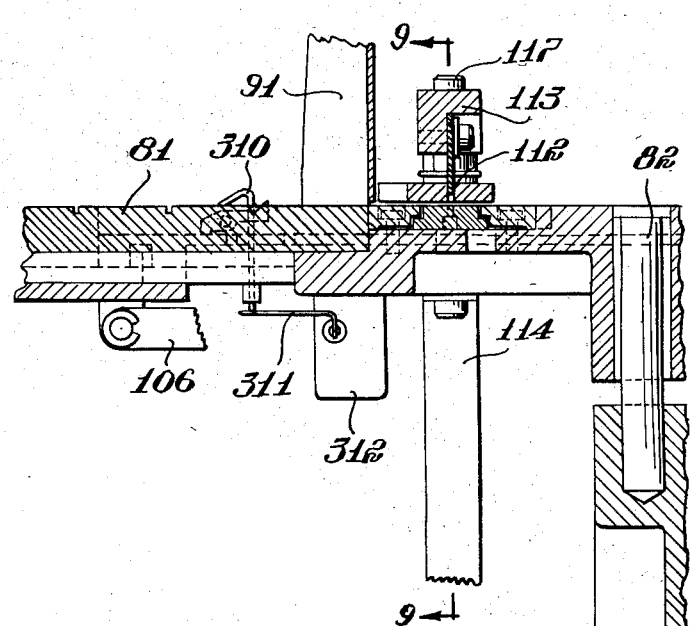
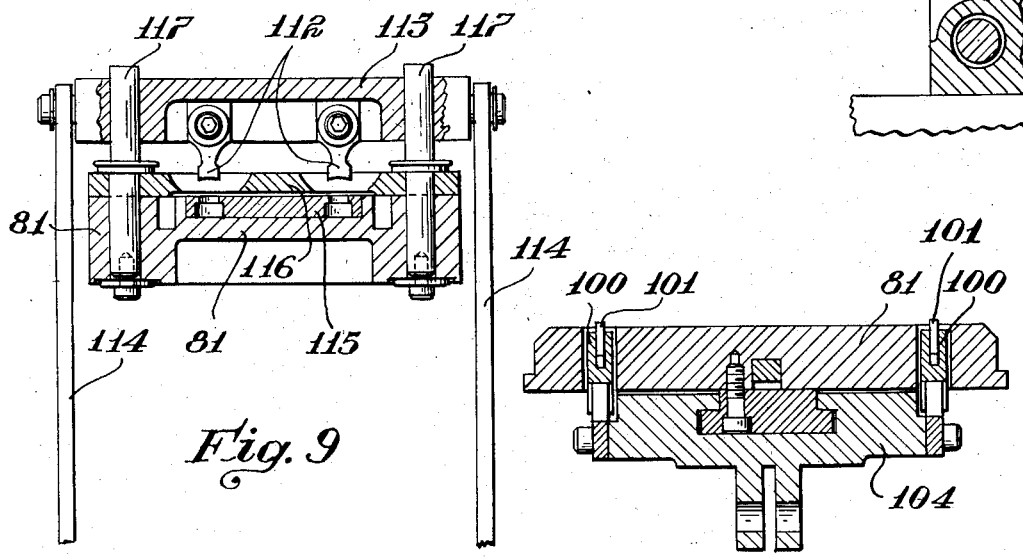
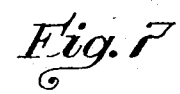

Inventors
Arnold R. Bone
Donald D. Sloan
by Roberts, Cushman & Grover
Att'ys.

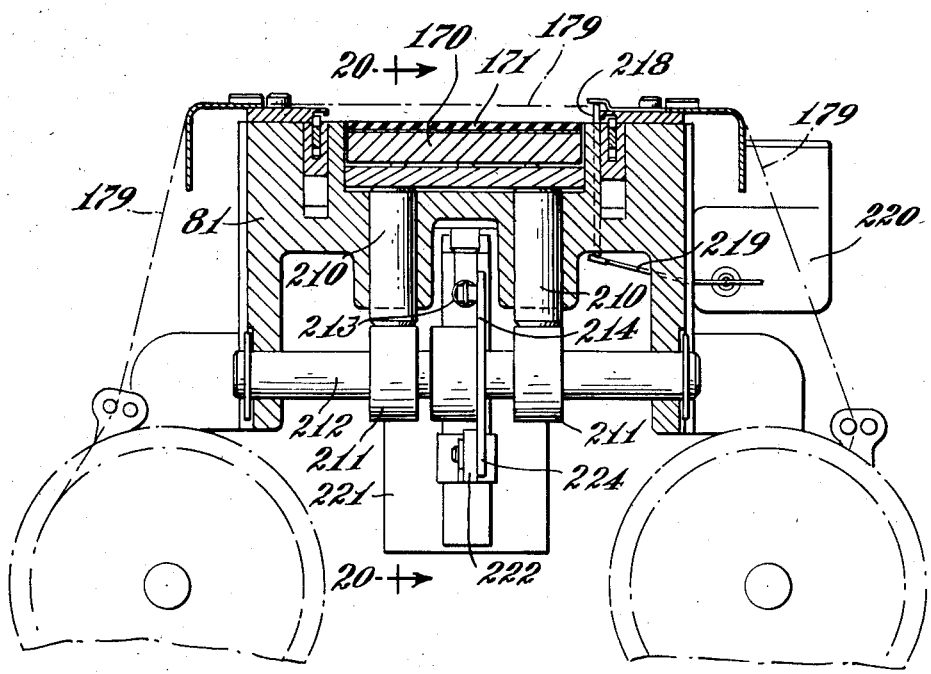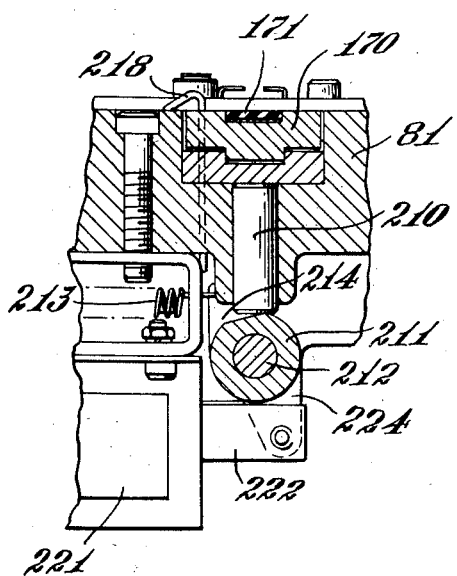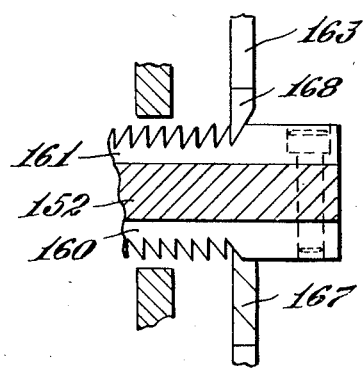

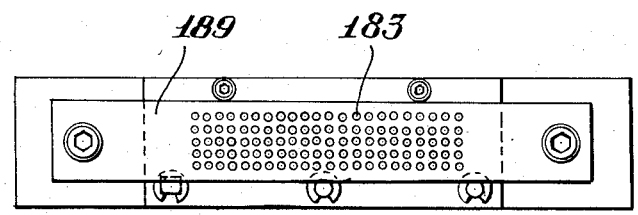
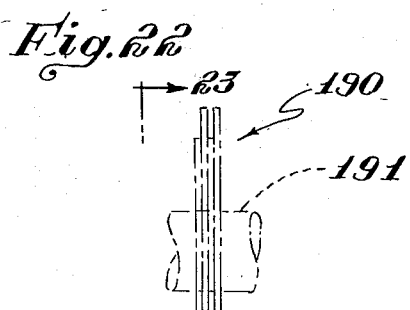
Fig. 22
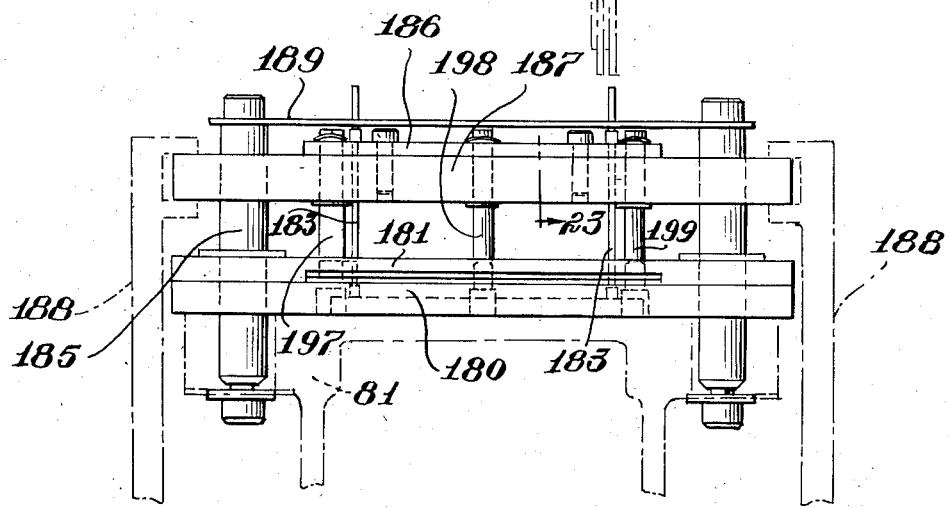
Fig. 21

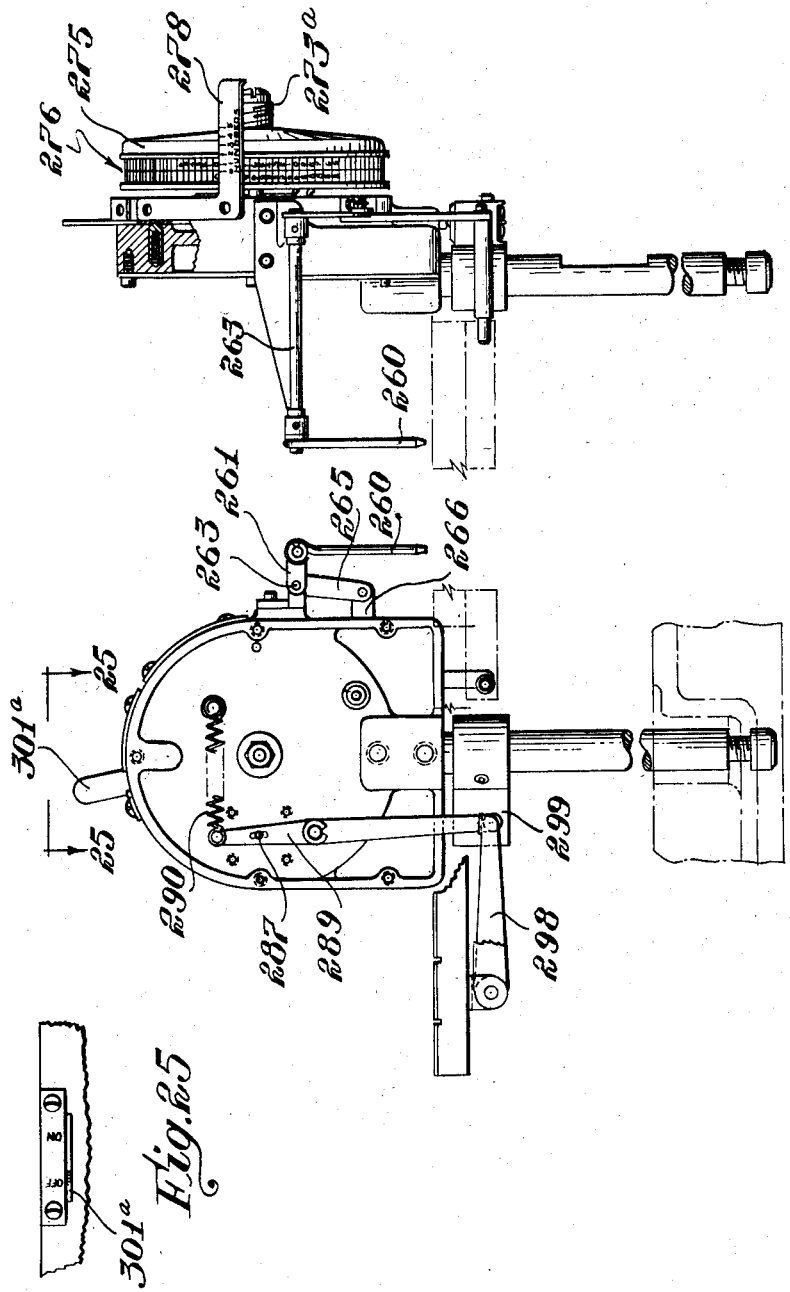

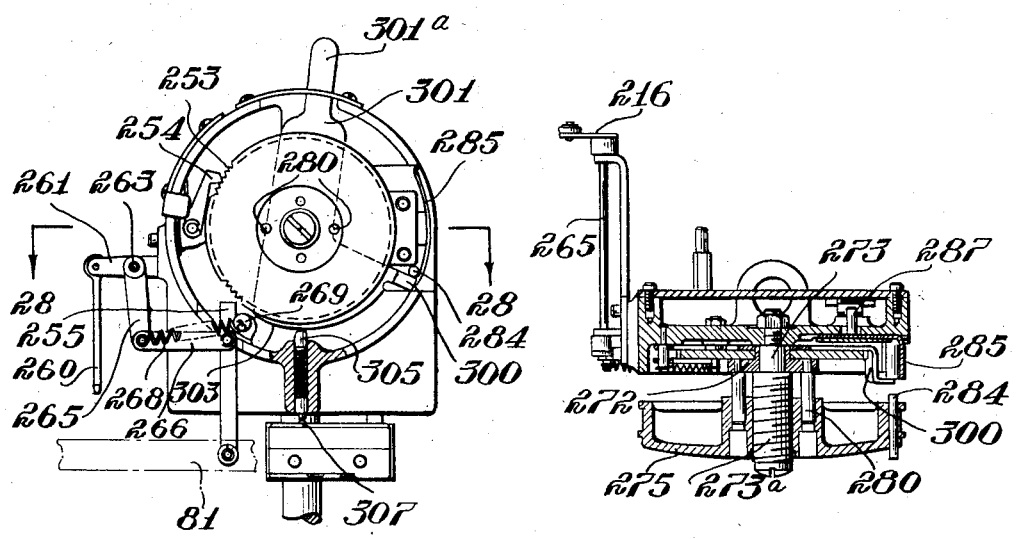
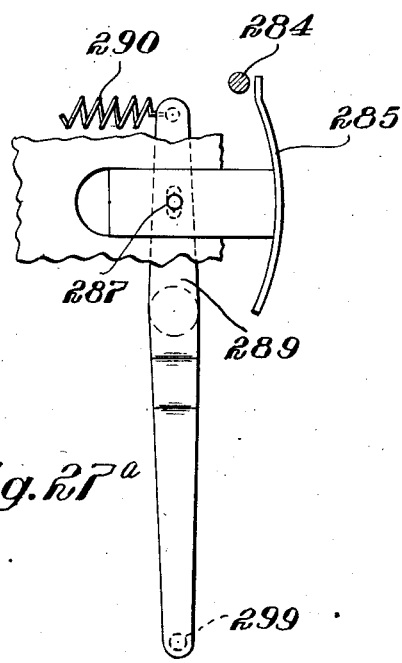

Inventors
Arnold R. Bone
Donald D. Sloan
by Roberts, Cushman & Grover
Att'ys.

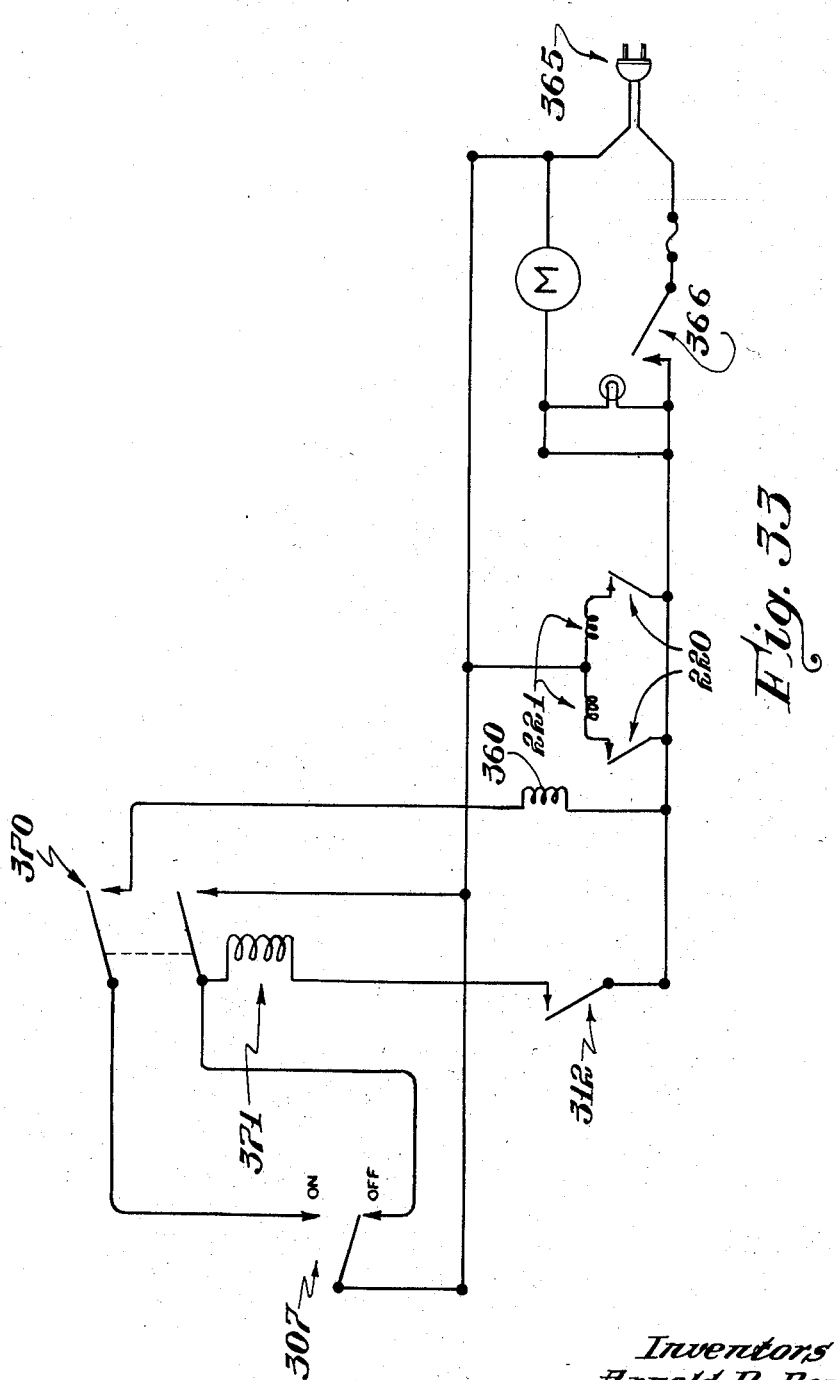

United States Patent Office 2,890,650
Patented June 16, 1959

2,890,650

APPARATUS FOR OPERATING ON SECTIONAL TAG MATERIAL

Arnold R. Bone, Needham, and Donald D. Sloan, Weston, Mass., assignors to Dennison Manufacturing Company, Framingham, Mass., a corporation of Massachusetts Application March 11, 1955, Serial No. 493,754

8 Claims. (Cl. 101—19)

This invention relates to operating upon sectional tag material, and more particularly applying indicia thereto, section-by-section.

A typical use for sectional tags is in tagging merchandise for sale in retail stores. In addition to a main section by which the tag is attached to the merchandise and which usually goes along with the merchandise when it is sold, the tag will have one or more other sections, perhaps as many as four or five other sections, which like the main section will carry indicia, and which are useful for statistical, control and analysis purposes. These other sections or some of them may be detached at various times, for instance before or at the time the tag is affixed to the merchandise, when the merchandise is sold, or even in the event the merchandise is returned to the store.

In the preferred form of the invention the indicia applied to the tags includes both ordinary legible characters such as numerals, and perforations which by their presence or arrangement can be "read" by electrical, mechanical or optical sensing mechanism. In most cases, some or all of the legible characters and some or all of the perforations will correspond in meaning, as for example when certain legible characters indicate a given size (for the use of the person affixing the tag, the salesperson and the customer) and certain perforations indicate this same size (for purposes of store management such as analysis of sizes sold, sizes to be reordered, etc.).

So much indicia needs to go onto a given tag and so much of this indicia needs to go onto a plurality of sections of the tag that in the practical manufacture of a machine for this purpose it is highly desirable that the machine shall operate section-by-section on the tag material, for instance, that a given printing means shall apply the same printed indicia to successive sections and that a given perforating means shall apply the same perforated indicia to successive sections. Thus at each operating station, the operation of the machine is cyclical, and within such a cycle of operation there is an advance of the tag material to the extent of the length of one section, and also an indicia-applying operation performed on a given section.

An important object of the invention is to provide an improved method and apparatus for handling sectional tags in batches, especially adapted to handle tags of various numbers of sections, for instance, three sections per tag in one batch, four sections per tag in another batch, or any other desired reasonable number of sections per tag in another batch.

In order to produce the desired number of tags in a batch, it is necessary to suspend the feed of the tag material from the supply after the desired number of tags, or the sections of material which will constitute the desired number of tags, have been fed from the supply. A cyclically moving part of the machine affords an expedient means for actuating a counter to institute suspension of feed from the supply. The present invention avoids any necessity for the operator to make any adjustment as between any parts of the machine which operate in timed relation to each other, and particularly any adjustment or any change in the relation between the counter and its drive, incident to change in the number of sections which are to constitute each tag.

The invention utilizes the principle of providing a single section of each tag with a distinguishing structural characteristic adapted to distinguish that section from each other section of the same tag, feeding the tag material section-by-section from a supply, sensing each section of each tag to determine whether such distinguishing structural characteristic is present, counting only those sections having said distinguishing structural characteristic, so that the count is independent of the particular number of sections which constitute a tag, and suspending the feed from the supply upon the attainment of a predetermined such count.

Although in the broader aspects of the invention the distinguishing structural characteristic that is so employed need not be one which has any other utility, the illustrated preferred form of the invention uses as such distinguishing structural characteristic a hole that can serve as the string hole by which the tag is attached to a garment or other article. Thus in this preferred form of the invention only those tag sections having this hole are counted.

A sensing means adapted to distinguish between the two types of sections, namely the sections having such holes and the sections not having such holes, may constitute a pin adapted to penetrate such hole if the hole is present and adapted to respond to the tag material of sections lacking such hole, the sensing means controlling actuation of a counter to prevent such actuation in case of presentation to the sensing means of material of the tag section lacking the hole.

Following counter-actuated suspension of feed of tags from a supply, those tags that have already been fed and counted are preferably completed without interruption, and the preferred form of the machine of the present invention accomplishes this in a particularly simple and expedient manner.

In the preferred form of the invention where the sensing means responds to tag material of sections lacking a hole as distinguished from sections having such hole, absence of a tag section at the sensing means will have the same effect as though a tag section having such hole were present, so that after feed from the supply has been suspended and no more tag sections reach the sensing means, the sensing means can allow the counter to count the cycles of operation of the machine. Means may be provided whereby the cyclic movement of the machine may be stopped after a predetermined count following such suspension of feed.

The present invention is applicable both to tags that have each been precut into the desired number of sections and are fed from a supply such as a stack of these tags in a hopper, and to strips of tag material that are severed in the machine into tags each having the desired number of sections. In this latter case the strip of tag material is preferably partially precut in such manner that a further punching or cutting at each division between sections will part the strip into tags of the predetermined desired number of sections. For example, if the tags are each to have three sections, the precutting is such that the further punching or cutting at each division between successive sections will result in parting the strip only at each third division between sections.

It sometimes happens that the supply of tag material will be exhausted before the desired number of tags have been completed in which case the supply must be replenished. The preferred form of machine of this invention is especially organized so that an exhaustion and replenishment of the supply will not result in an erroneous count or production of an incorrect number of tags, or interfere with the timing of the machine.

Other advantages and objects of the invention will be apparent from this specification and its accompanying drawings wherein the invention is explained by a description of a preferred example thereof.

In the accompanying drawings:

Fig. 5 is a side elevation of a machine as arranged for use in connection with continuous strip material;

Fig. 6 is a view taken generally in plan, at the level of the top of the bed of the machine of Fig. 5, that is, generally on the line 6—6 of Fig. 5, but with some parts omitted;

Fig. 7 is a vertical transverse sectional view taken on the line 7—7 of Fig. 5;

Fig. 8 is a fragmentary view mainly in vertical longitudinal section, showing a portion of the left end of the bed and portions of the cut-off die which is employed in connection with cotinuous strip material;

Fig. 9 is a vertical transverse sectional view taken on the line 9—9 of Fig. 8, showing particularly the cut-off die;

Fig. 18 is a sectional view on the line 18—18 of Fig. 11;

Fig. 19 is a transverse sectional view through one of the platens;

Fig. 20 is a fragmentary vertical sectional view taken generally on the line 20—20 of Fig. 19;

Fig. 21 is a vertical sectional view through the bed showing punch mechanism associated therewith and showing diagrammatically two of the punch controlling interposers;

Fig. 22 is a plan view showing the bank of punches of Fig. 21;

Fig. 24 is a fragmentary elevation, from the same point of view as Fig. 5, showing the counter assembly, with a side cover plate thereof removed, and adjacent portions of the bed;

Fig. 25 is a fragmentary view in plan, taken on line 25—25 of Fig. 24, showing the starting handle associated with the counter assembly;

Fig. 26 is a view mainly in right elevation, of the counter assembly of Fig. 24, partly broken away;

Fig. 27 is a side view of the counter assembly, taken from a point of view opposite to that of Figs. 5 and 24, and with the handwheel of the counter omitted;

Fig. 27a is a fragmentary view of some of the elements of Figs. 27 and 24;

Fig. 28 is a horizontal sectional view of the counter assembly taken on the line 28—28 of Fig. 27;

Fig. 33 is a simplified wiring diagram of a preferred electric circuit for the control of the machine.

Tag material and finished tags

A typical tag to which indicia is to be applied by the machine may have a main section 50 and one or more detachable stub sections 51, each section being demarked from the neighboring section of the same tag by a perforated weakened line 52.

Feed slots 53 are provided at uniform distances along the edges of the tag, preferably at the divisions between sections.

Figure 1:
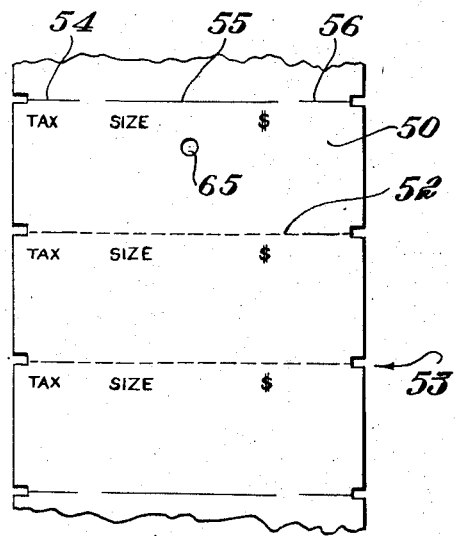
Fig. 1 is a plan view showing a portion of continuous strip material for three-section tags.
Figure 2:
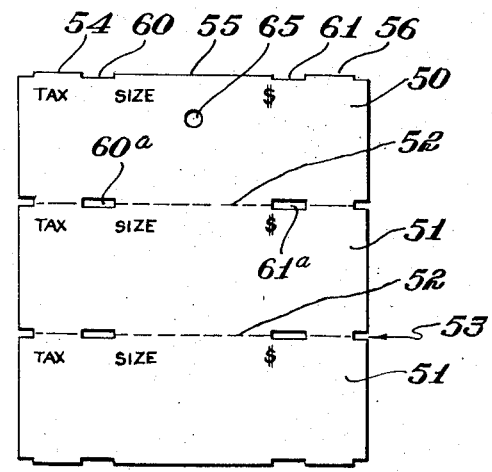
Fig. 2 is a plan view of a three-section tag blank cut from the strip of Fig. 1.

When continuous strip material, as in Fig. 1, is severed into tags in the machine to be described, those divisions which are to divide one tag from another are initially pre-cut in the strip form as at 54, 55 and 56 in Fig. 1, to leave only narrow uncut intervening neck portions which may be cut out by a knife in the machine, as at 60 and 61 in Fig. 2, to complete the detachment of the tags. Although the cutting knife of the machine preferably acts invariably at each cycle of the machine and accordingly makes corresponding cuts at 60a and 61a at the division lines between sections of a given tag, these latter cuts do not detach these sections from each other and these sections remain connected at the lines of perforations 52.

Figure 3:
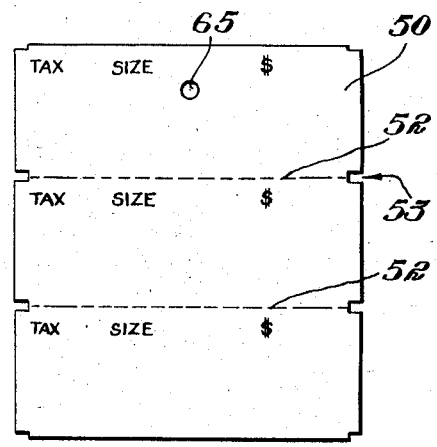
Fig. 3 is a plan view of a precut three-section tag blank.

When separate tags, pre-cut to the desired number of sections each, are employed as the supply, as in Fig. 3, such cutting in the machine is unnecessary, and no such cut-out portions as 60, 61 or 60a, 61a need appear.

In both the pre-cut tag of Fig. 3 and the continuous supply strip of Fig. 1 the main section 50 is provided with a distinguishing structural characteristic, shown as a hole 65, by which this section differs from all the other sections that constitute or are to constitute the tag. As will subsequently be explained, this distinguishing structural characteristic cooperates with sensing means in the machine. As indicated above, the hole 65 may be used as a string hole for attachment of the tag to a garment or other article.

Any desired pre-printing may also be carried by the sections of the pre-cut tags or continuous supply strip, for example classifications such as "TAX" and "SIZE," a dollar sign, ass hown in Figs. 1 and 3, as well as pre-printed underscoring and overscoring lines (Fig. 4) which may be used to classify or group together some of the subsequently applied indicia.

In general, the purpose of the machine is to apply corresponding indicia to the several sections of the tag. The quantity of such indicia is generally such that several indicia-applying stations, each having an indicia-applying couple, are needed. In the illustrated machine there are three indicia-applying couples, the first and third being printing couples for legible indicia, and the second being a punching couple for perforated coded indicia.

Figure 4:
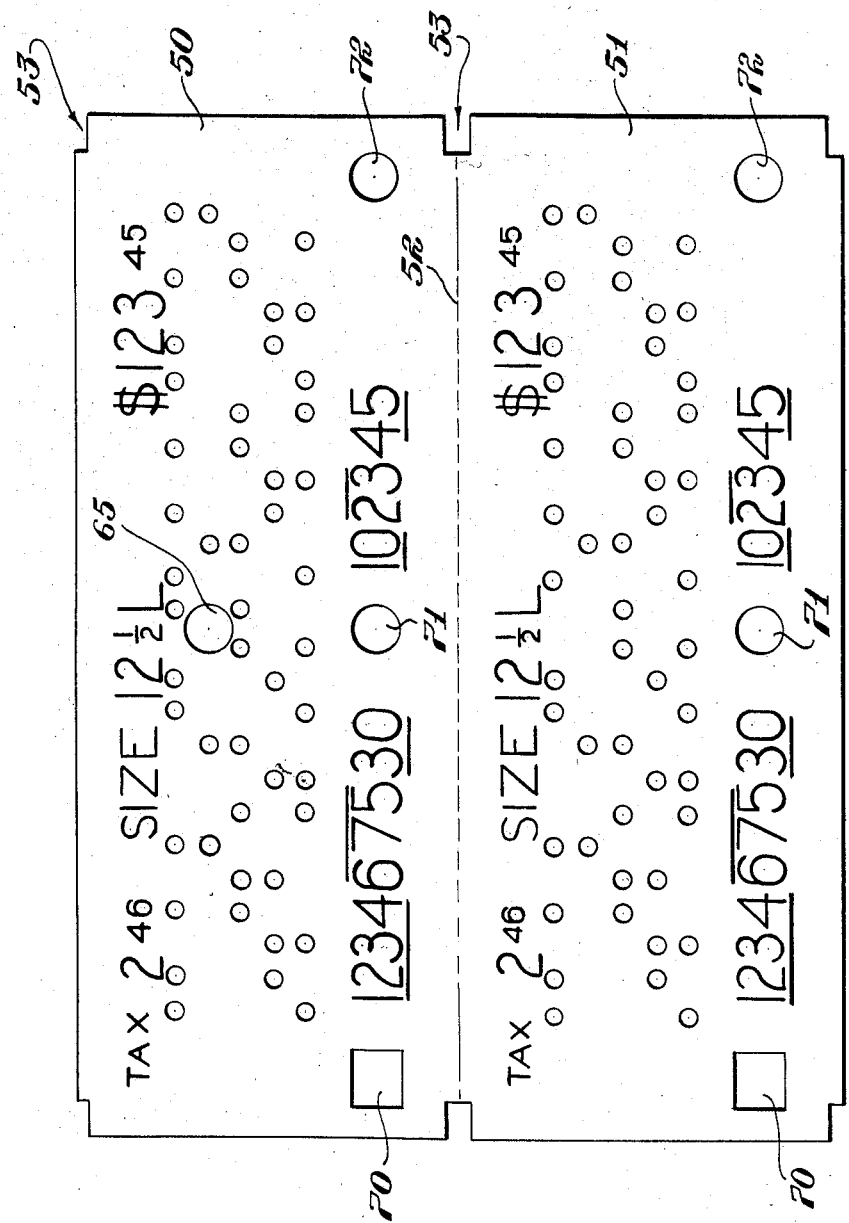
Fig. 4 is a plan view on a considerably enlarged scale, of a two-section tag after the tag has been printed and punched by the machine of the present invention.

Fig. 4 shows on the larger scale a typical completed two-section tag. At the first indicia-applying station the first section of this tag to reach this station has received a row of printed indicia extending lengthwise of the tag section, near its top, and specifying the amount of tax (2⁴⁶), the size (12½L) and the price (123⁴⁵). At the third indicia-applying station the same section has received another row of printed indicia, near its bottom, comprising digit symbols for manufacture and style (1234), for Department (675), for Class (30), for color (10), for fabric (23), and for season (45).

At the second or intermediate indicia-applying station the ticket section has received perforation, in code, of such of this information as may be desired, in this case, all of this information except the amount of the tax.

In the arrangement shown, the coded indicia corresponding to a printed digit is punched in the form of two holes in a vertical column in which there are five possible positions. Beginning at the bottom position, these positions have the individual values of one, two, four and seven respectively. Where two punchings occur in the four lower positions, the sum of the individual values of the positions punched represents the digit in question, except that the sum of four and seven is taken to represent the digit zero.

The upper or fifth position has no numerical value but is employed in order that there may always be two holes punched for any given digit, a feature that is desired in order to insure accuracy in subsequent reading of the perforations in a sensing mechanism. Thus, for instance, taking the left vertical column of punching in a section of the tag of Fig. 4, this column is shown as punched in the lowest or "one" position and also in the top or numerically valueless position and represents the digit "one" which is the digit at the left of the bottom row of printing.

Simultaneously with receiving its coded perforations, the tag section has also had three larger registration holes 70, 71 and 72 punched therein for the purpose of insuring that the coded perforations will be in accurate registration with mechanism for reading the coded perforations.

As indicated above, the indicia, both printed and perforated, is applied identically to each section of each tag.

*General organization of feeding, printing and perforating mechanism*

The machine is so organized that tag material is advanced from a supply, section by section, along a bed, and the bed is reciprocated vertically to perform successive operations upon the tag sections at successive stations. If continuous strip material is fed into the machine, a cut-off punch device for separating the material into separate tags is provided, and the vertical reciprocation of the bed causes the material to be acted on by this device.

At successive stations, the vertical reciprocation of the bed actuates respectively the printing of the upper group of printed indicia near the top of a tag section, the punching of the coded perforation and the registration holes, and the printing of the lower group of printed indicia near the bottom of a tag section.

Each printing station includes a printing device in the form of a group of individually settable print rings. Beneath such printing device the reciprocating bed carries any suitable ink ribbon and a platen adapted to force the tag section against the ink ribbon and print rings.

The vertically reciprocating bed also carries a die adapted to force a tag section up against a bank of punches that effect the code perforation and the punching of the registration holes.

The stationary head of the machine, carrying the print rings and the bank of punches, also carries interposers for controlling the perforating punches and interconnections between the individual print rings and the individual punch interposers whereby the perforating punches are controlled in accordance with the setting of the print rings. Thus, simultaneously with the setting of a given print ring to print a given digit, a corresponding punch interposer can be set to cause the punches of a given column to perforate the coded indicia corresponding to the same digit.

The machine operates in cycles, and during each cycle of normal operation, tag material is advanced along the bed to the extent of one tag section, and the bed rises and lowers.

*Detailed description of feeding, printing and perforating mechanism*

A stationary base of the machine is indicated generally at 80 in Figs. 5 and 6. The vertically reciprocable bed 81 is vertically slidable on posts 82, Figs. 6 and 8, under the control of toggles which comprise upper links 83 and lower links 84, Fig. 5. Lower toggle links 84 are fast on shafts 85 which are oscillated through cam followers 86, Fig. 6, and cams 87 upon the main cam shaft 88.

The left end of the bed may carry any suitable magazine or holder for the supply of tag material. For example, a stack of pre-cut tags may be guided at its right end by guide elements 91 having a suitable gate through which the tags may leave, and at its left end by a guide element 92. The left guide element 92 may be adjustable lengthwise of the bed in steps each corresponding to the width of one tag section, so as to accommodate tags of various numbers of sections. In Fig. 5 the left guide element 92 is shown in broken lines to indicate that it may be removed, as it would be when the machine is arranged for operation with continuous strip material.

The bed 81 carries longitudinally reciprocable feed bars 100, Fig. 7, carrying feed pawls 101 adapted to engage in the feed slots 53 of the tags. Feed bars 100 are connected to a feed slide 104, Figs. 5 and 7, which is connected by a link 106 and crank 107, Fig. 5, to a shaft 108, Fig. 6. Shaft 108 is oscillated through a cam follower 109 and cam 110 on the main cam shaft 88, Fig. 6. The stroke of reciprocation of feed bars 100 and their pawls 101 is such as to advance the tag material one tag section per cycle, and as indicated above, each cycle also raises and lowers the vertically reciprocable bed.

Cut-off punches for severing the necked portions between adjacent tags are located above the bed, close to the exit gate of the magazine, as shown in Figs. 8 and 9. Punches 112, spaced to make the cuts 60, 61 of Fig. 2, are carried by a punch holder 113 supported by arms 114 from lower non-reciprocating portions of the machine. The bed 81 carries a corresponding die 115 which is overlaid by the tag material. A stripper 116, through which the punches can operate overlies the tag material.

The bed 81 and the punch holder 113 are indexed in horizontal directions by two slide pins 117 carried by the bed which permit the bed to rise and fall with relation to the punch holder while precluding any misalignment between the cut-off punches and their die and stripper.

The cut-off punches are omitted when pre-cut tags are employed.

In passing through the machine the tag material is subjected to detecting and sensing operations and various of the functions of the machine are controlled by such detecting and sensing. The machine includes provision for insuring that the correct number of tags will be produced notwithstanding exhaustion and replenishment of the supply during a run, and provision against improper starting up of the machine. A detailed description of these features will be postponed until after the printing and perforating mechanism has been more fully described.

The printing head indicated generally at 120 in Fig. 5 is pivoted at 121 to a stationary support including uprights 123 attached to the sationary base, these uprights 123 being also shown in cross section in Fig. 6. The left end of the head 120 is also detachably locked to a stationary support including uprights 124 by a removable pin 126. By removing the pin and swinging the head about pivot 121, access may be had to the right-hand portion of the bed and to the print rings, punch interposers and interconnecting mechanism of the head. Normally the head will include an outer cover which will more completely enclose tthe apparatus, but this outer cover has been omitted from the drawings, excepting in Fig. 17, for clarity of illustration.

Figure 12:
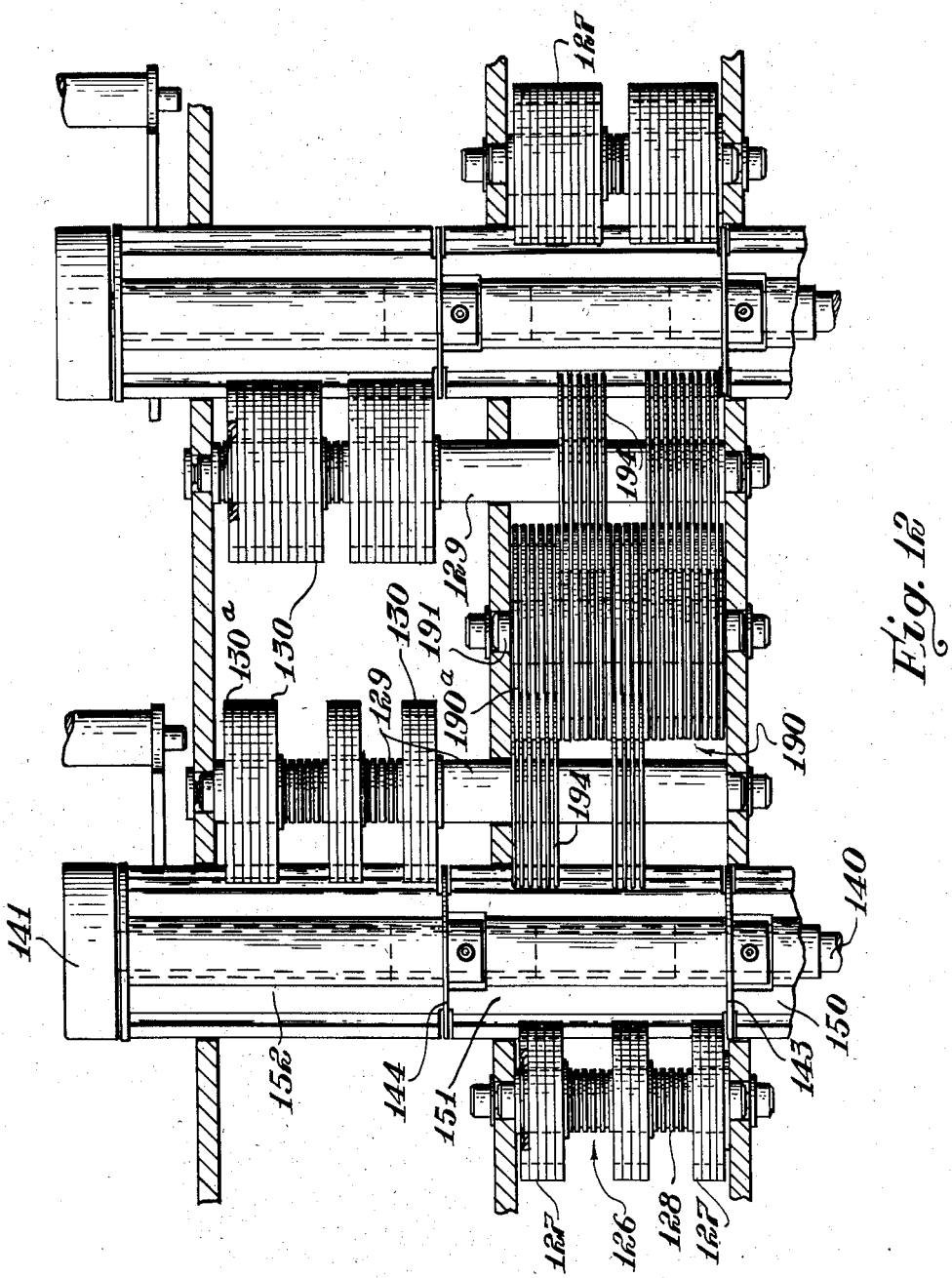
Fig. 12 is an expanded view of the head, taken on the line 12—12 of Fig. 10 so that the axes of certain shafts and arbors are, for purpose of illustration, shown as lying in a common plane.

Fig. 12 is an expanded view in which the axes of the main rotatable and slidable elements on the head have been brought into a common plane. The head includes two print ring assemblies, one at the left of the head for printing the indicia such as tax, size and price near the top of the tag, and the other at the right of the head for printing the remaining indicia near the bottom of the tag.

Figure 13:
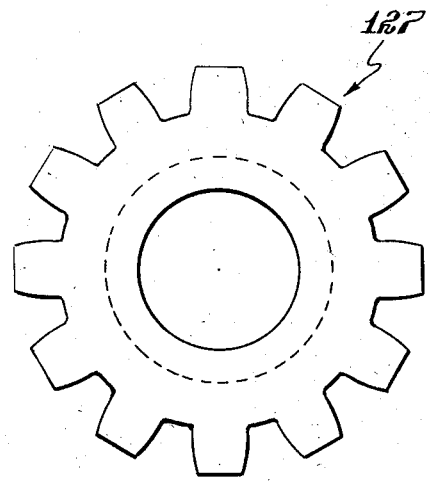
Fig. 13 is a side elevation of a print ring.
Figure 14:
Fig. 14 is an edge view of the print ring of Fig. 13.

The first print ring assembly, indicated at 126, at the left of the head, comprises a series of tax, size and price print rings 127 each rotatable upon an arbor 128. Each such print ring constitutes a toothed gear carrying printing characters on its teeth, for example as shown in Figs. 13 and 14.

Figure 15:
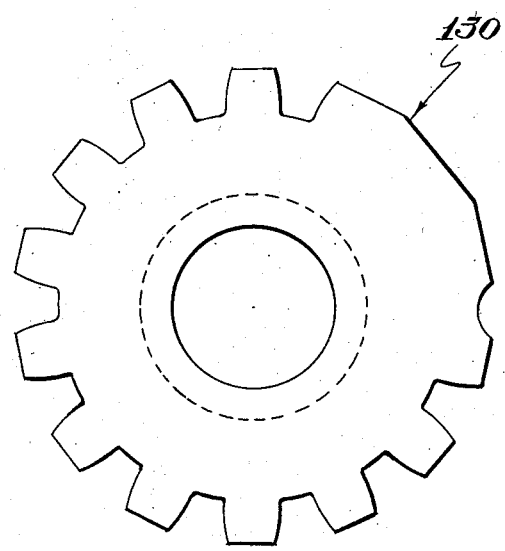
Fig. 15 is a side elevation of an indicator ring.
Figure 16:
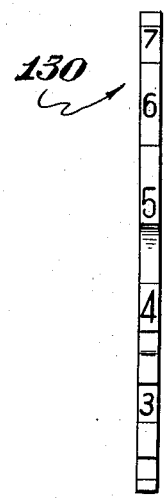
Fig. 16 is an edge view of the indicator ring of Fig. 15.

An indicator shaft 129 carries, rotatably thereon, indicator rings 130 corresponding to the tax, size, and price print rings 127, and also rotatably thereon, one extra indicator ring 130a. Each indicator ring likewise constitutes a toothed gear, and carries indicating indicia on its periphery, for example as shown in Figs. 15 and 16.

A typesetter shaft 140, rotatable by a handwheel 141, is longitudinally movable transversely of the print and indicator rings and carries fast thereon two ring-setter gears 143 and 144. The setter gears 143 and 144 are spaced so that when one such gear engages with a particular print ring on arbor 128 the other such gear engages with the corresponding indicator ring on shaft 129.

Figure 10:
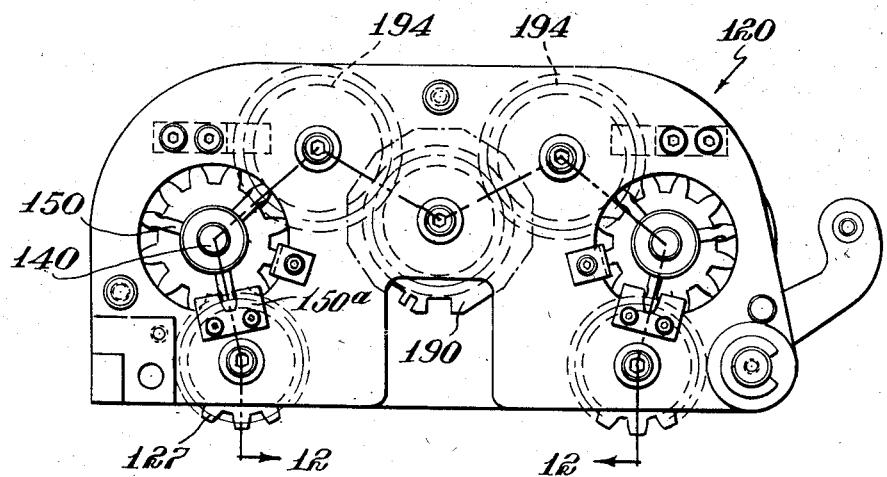
Fig. 10 is a side elevation of the head, taken from the same point of view as Fig. 5.

Upon the typesetter shaft 140, front, center and rear slides 150, 151 and 152 are mounted, respectively in front of the setter gear 143, between the setter gears 143 and 144, and in rear of the setter gear 144. Shaft 140 is rotatable relative to the slides 150, 151 and 152 but the slides partake of the longitudinal movement of the shaft 140. Each slide 150, 151 and 152 is essentially in the form of three equally spaced radial vanes. One blade of each slide is directed radially toward the axis of the print ring arbor 128 and another blade of each slide is directed radially toward the axis of the indicator shaft 129. Each slide also engages with a stationary guide, of which one is indicated at 150a in Fig. 10, which prevents it from rotating around its axis, with the result that all print rings and indicator rings that are engaged by any of the slides are prevented from rotating and are locked in place.

The arrangement of the slides longitudinally of the shaft 140 is such that each print ring and each indicator ring is thus engaged and locked by one of the slides except when engaged by a setter gear 143 or 144. In the expanded view of Fig. 12 the shaft 140 is in a position such that all the print and indicator rings are locked by the slides 151 and 152, the setter gears not being in engagement with any print ring or indicator ring.

From Figs. 13 and 15 it will be noted that the indicator rings have larger diameters than the print rings. As shown in Fig. 15, the teeth of each indicator ring are interrupted, which has the effect of limiting rotation of the setter gear 144, setter shaft 140 and setter gear 143 in both directions when the setter gears engage any indicator ring and the corresponding print ring. Thus each indicator ring is maintained in proper relation to its corresponding print ring notwithstanding that the diameter of the indicator ring is larger than that of the print ring.

Any suitable pawl and ratchet wheel mechanism interposed between the handwheel 141 and the non-rotatable slide 152 yieldingly indexes the handwheel and shaft 140 so that the teeth of the setter gears 143 and 144 will align themselves with the vanes of the slides 150, 151 and 152 so as to move freely into and out of mesh with the print rings and indicator rings and leave the print rings and indicator rings in proper alignment for reception of the vanes of the locking slides.

The above described printing and indicating devices at the left of the head for the tax, size, and price indicia are essentially duplicated at the right of the head by similar devices, designated by the same reference characters, for printing and indicating the further printed indicia that appears near the bottom margin of the tag section. It may be pointed out, however, that the print rings on the right-hand print ring arbor and the indicator rings on the right-hand indicator shaft need not correspond either in location or number to those at the left of the head. In the illustrated arrangement of Fig. 12 there are more of these print rings and indicator rings at the right of the head than at the left of the head, affording the possibility of printing somewhat more indicia near the bottom edge of the tag section than is shown in Fig. 4.

Each typesetter shaft 140 may be shifted longitudinally in steps corresponding to the width of a print ring to bring its setter gears into meshing engagement with successive print rings and indicator rings, and at any such step the engaged print ring and the engaged indicator ring may be set by appropriate rotation of the typesetter shaft handwheel 141.

Figure 11:
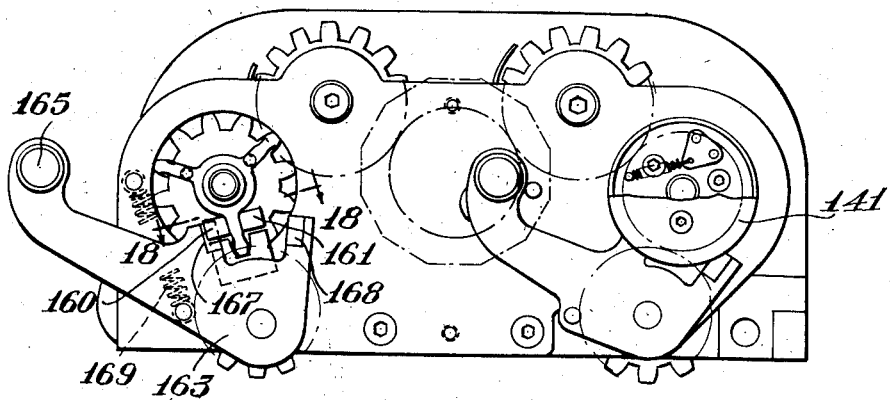
Fig. 11 is a side elevation of the head, taken from the point of view opposite to that of Fig. 10.

The step-by-step longitudinal shift of each typesetter shaft is accomplished by a ratchet mechanism which also acts to index the setter shaft relative to the rings. Referring to Figs. 11 and 18, one of the vanes of the rear slide 152 carries ratchet bars 160 and 161 back-to-back on its opposite sides, the teeth of the two ratchet bars being staggered by one-half tooth intervals.

A latch 163, pivoted at 164 and provided with a handle 165, has opposed teeth 167 and 168 alternately engageable with teeth of ratchet bars 160 and 161. Latch 163 is normally held in engagement with a tooth of ratchet bar 160 by a means of a spring 169. Depressing the latch and engaging tooth 168 with ratchet bar 161 as in Fig. 18 advances the slide 152 and typesetter shaft 140 one-half a step, that is, to the extent of one-half a ratchet tooth, and allowing the latch to return to engage its tooth 167 with ratchet bar 160 as in Fig. 11 advances the setter shaft another one-half step, completing the shift of setter gear 143 from one print ring to the next and of setter gear 144 from one indicator ring to the next.

The setter shaft 140 may be manually shifted freely in either direction when the latch 163 is held in mid-position.

At each print ring assembly the tag material on the bed is underlain by a platen 170 carrying a pressure pad 171, and is overlain by a suitable ink ribbon 179, Fig. 19, so that upward movement of the bed causes the print rings to print the upper face of the tag through the ink ribbon.

The location of the two print ring assemblies relative to each other is such that a given tag section, advancing step by step along the bed, will reach its printing position beneath the left print ring assembly and be printed there during one cycle, and will reach its printing position beneath the right print ring assembly and be printed there during the fourth succeeding cycle. In other words, between the two printing positions there are three intermediate positions at which the given tag section will pause in its step-by-step advance. The middle one of these three intermediate positions is employed for the punching operation that provides the coded perforations and also the positioning holes 70, 71 and 72.

Figure 23:
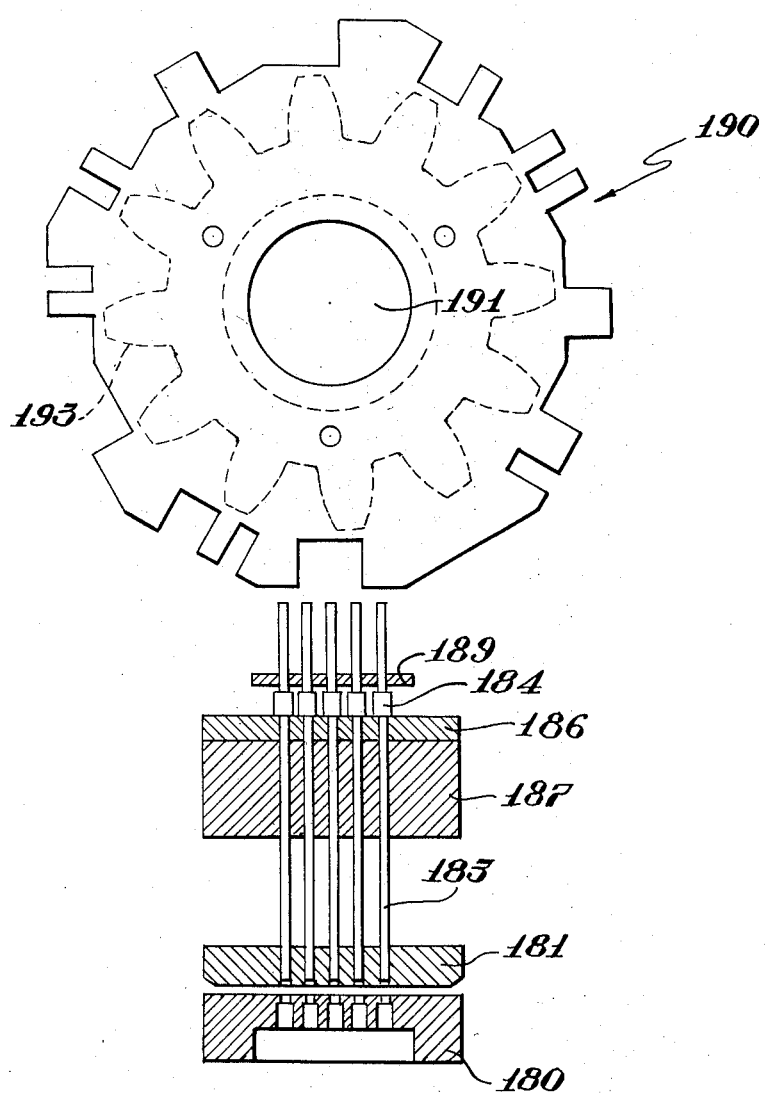
Fig. 23 is a vertical sectional view taken on the line 23—23 of Fig. 21.

Referring to Figs. 21 and 23, the bed 81 in the region between the two print ring assemblies carries a die plate 180 and a lower stripper 181, the lower stripper being recessed to accommodate tag material resting on the die plate.

A large number of small diameter punches 183 are suspended by sleeves 184 thereon from an upper plate 186 secured to a stationary support plate 187 supported from the stationary base of the machine by uprights 188. Punches 183 are vertically slidable in holes in the plates 186 and 187 and extend down through corresponding holes in the lower stripper 181. Upon rise of the die plate 180, carrying a tag section, if any given punch 183 is allowed to rise freely with the tag, it will not penetrate the tag, but if the upward movement of the punch is checked the punch will penetrate the tag, the lower end of the punch entering into a corresponding hole in the die plate 180.

The stationary plate 187 and the vertically movable die plate 180 and stripper 181 are maintained in accurate alignment by vertical guide rods 185 to which the die plate 180 and stripper 181 are fastened and which slide vertically through holes in the stationary plate 187.

The upper end portions of the perforating punches 183 extend loosely through holes in an upper retaining plate 189 which is fastened to the guide rods 185.

The individual punches 183 are controlled by a series of interposers 190 rotatably mounted upon an arbor 191 above the punches.

As shown in Fig. 23 a typical interposer 190 has a notched periphery, the cutaway portions of which will permit the free rise of underlying punches and the non-cutaway portions of which will check the rise of underlying punches and cause these punches to perforate. The interposer in Fig. 23 is shown as turned to a position to permit the free rise of the second, third and fourth punches in a particular column of five punches and to check the rise of the two outside punches in this column, causing perforations to be made in the "one" position and the numerically valueless position, and thereby recording the numeral one according to the code described above.

Each interposer is secured to a gear 193 meshing with an idler gear 194 (Figs. 10 and 12) which is freely rotatable on either the left or the right indicator shaft 129. The several idler gears 194 are engageable by the respective left or right setter wheels 143 that engage the corresponding print rings. Thus setting a given print ring for a given character sets any corresponding interposer so as to control the perforating corresponding to such printing. The idler gear for the endmost interposer 190a is also settable by the left typesetter gear 143 even though there is no print ring corresponding to this endmost interposer.

This endmost interposer 190a may be used to control the endmost column of perforations of the tag, which column may identify or furnish information about the tags of a particular batch without corresponding to indicia printed thereon by the machine, and the setting of this interposer 190a is indicated by the indicator ring 130a of Fig. 12.

The idler gears 194 are held in their adjusted positions by the slides 150 and 151 in the same manner as the print ring gears, thereby locking the interposers in their set positions.

The interposers may have certain blank or ineffective positions corresponding to positions at which their interconnected print rings may have teeth bearing no printing characters, so that printed and perforated indicia may be omitted from any part of the tag when desired.

Further, those interposers that control perforation which in the main section of a tag would occur near the hole 65 may have blank spaces that will prevent perforating punches from acting through or close to this hole 65, and the corresponding print rings may be correspondingly limited in number of printing positions.

Figure 17:
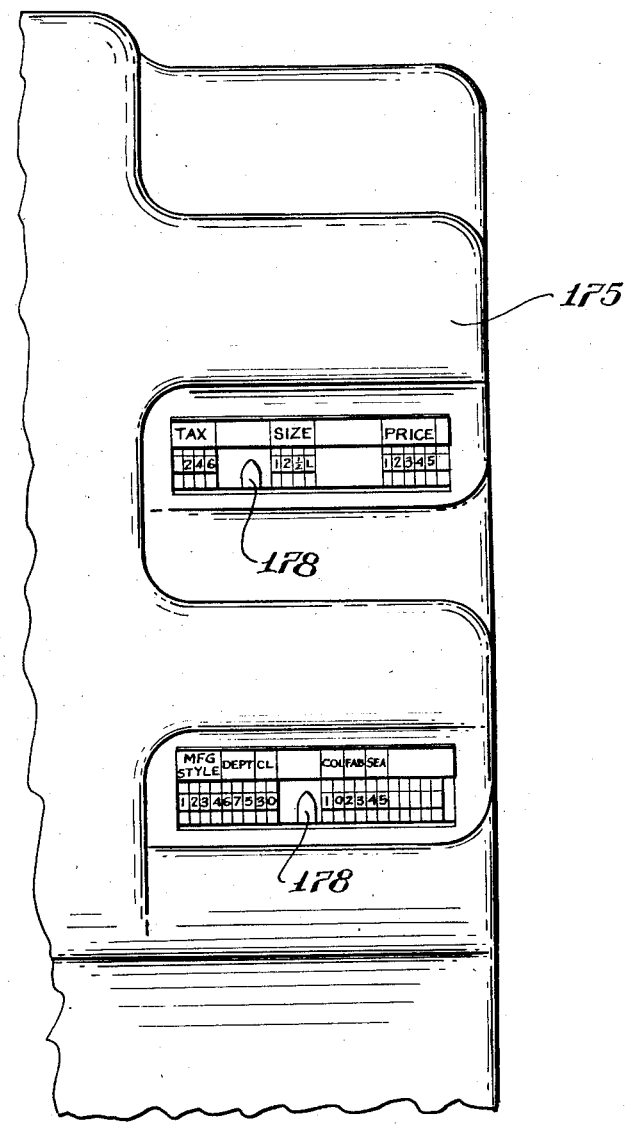
Fig. 17 is a fragmentary view taken from a usual position of the operator, showing a fragment of the cover of the head and exposed portions of indicator rings of the head.

Referring to Fig. 17 the indications upon the indicator rings, corresponding to the settings of the print rings and punch-interposers, are exposed to view through openings in an outer cover 175. Notations of the classes of indicia, such as "TAX," "SIZE," etc. are aligned with the indicator rings of the respective classes, and pointers 178, attached to the vanes 152 serve to show the momentary locations of the setter gears 143.

Referring again to Figs. 21 and 22, the plate 187 has fastened to it a larger punch 197 for punching the hole 70, and other large punches 198, 199 for punching the holes 71 and 72. These larger punches operate through holes in the same die plate 180 that receives the smaller punches, and accurate location of the coded perforations with respect to the positioning holes 70, 71 and 72 is assured.

It will be understood that in starting up the machine for a given batch of tags, there will at first be no tag sections in position to be printed at the two print wheels, and that in completing a given batch the last tag sections will successively pass beyond the two print ring assemblies before the machine is stopped.

It is preferred to provide for removing each platen 170 from operative position whenever no tag material overlies the platen, thus preventing printing onto the surface of the platen.

Referring to Figs. 19 and 20 each platen 170 is supported by push rods 210 which are under the control of a solenoid 221 controlled by a feeler 218 responsive to tag material at the platen. The solenoid may be employed either to hold the push rods 210 and platen raised when tag material is present, or to overcome an opposing spring so as to cause the push rods and platen to drop when tag material is not present, this latter arrangement being shown in Figs. 19 and 20.

Referring to Figs. 19 and 20, cams 211 fast on a camshaft 212 engage the bottoms of the push rods 210 and a spring 213 acting on a crank arm 214 fast on camshaft 212 normally retains the cams 211 in a position to hold the platen in an elevated operative position.

The feeler 218, in the path of the tag material at the printing position, is normally held depressed by the presence of tag material and acts through an arm 219 to hold open the contacts of a microswitch 220 controlling the circuit to the solenoid 221. The microswitch 220 is constructed so as to tend to close its contacts and, through the arm 219, raise the feeler 218 when tag material is not encountered. The armature of the solenoid is connected by link 222 to a crank arm 224 fast on camshaft 212. When the solenoid 221 is energized by the feeler 218 rising in the absence of tag material, the solenoid then acts to overcome the force of spring 213 and turn the camshaft 212 to a position where low portions of the cams 211 allow the platen to drop down out of operative position.

In case it is desired, for instance for checking the motions of the machine, that its operative parts can be moved manually as by a hand crank, without the machine being electrically energized, then it becomes preferable to employ the solenoids to hold the push rods and platens raised rather than to cause the platens and push rods to drop. Thus the platens will not be improperly left raised for lack of energization of the solenoids. In this case the cams 211 should be appropriately shifted on shaft 212 so that energization of the solenoid 221 brings high parts of the cams to the push rods and the spring 213 tends to bring low parts of the cams to the push rods, and the switch 220 should be constructed so as to tend to open its contacts and to raise the feeler 218. When tag material holds the feeler 218 down and switch 220 closed, the solenoid acting through cams 211 will hold the platen up. However when the feeler 218 rises, the spring 213 will cause the cams to move to a position where low portions of the cams allow the platen to drop.

It is thus assured that when there is no tag material at the platen the platen will not receive any inked impression through the ribbon, and so will not offset such impression onto the bottom surface of a subsequent tag section.

Counter and control of machine

The counter 250 is located at the far side of the bed as viewed in Fig. 5. In Fig. 5 the counter is shown as provided with a cover plate 251 which is omitted in Fig. 24.

Associated with the counter, and controlling its actuation, there is provided a sensing means for distinguishing between the two types of tag sections, that is, those sections that have a hole 65 and those sections that do not have such hole.

The counter includes a ratchet wheel 253, Fig. 27 yieldingly held in position by a holding pawl 254 but adapted to be advanced notch by notch by an actuating pawl 255 which is connected to and moved up and down by the bed 81.

A sensing element in the form of a pin 260 is located over the bed 81 in position to penetrate the hole 65 in a tag section. Pin 260 is suspended from a crank arm 261 fast on a shaft 263. Shaft 263 carries a crank arm 265 connected by a link 266 to the actuating pawl 255. A spring 268 urges the link 266 and actuating pawl 255 toward the right in Fig. 27, holding the pawl against a stop 269, at which position the pawl is able to actuate the ratchet wheel 253 when the bed 81 rises.

However, when the pin 260 encounters a tag section lacking a hole 65, rise of this tag section raises the pin 260, which acts through the crank 261, shaft 263, crank 265 and link 266 to move the actuating pawl 255 away from the ratchet wheel 253 and prevent actuation of the counter.

If the leading edge of the strip of tag material is beneath the cut-off punches 113, the first cycle of operation of the machine will advance the strip one tag section to a position beneath the pin 260 and then raise the bed. Since there is no hole 65 in the leading section of tag material, the counter will not count this cycle of operation. If the tags are to comprise say three sections, the next cycle of operation will also not be counted by the counter. Finally, when the main section of the tag having a hole 65, rises at the pin 260, and the pin penetrates this hole 65, the counter is permitted to be actuated. Thus the counter will count the number of tags, regardless of the number of sections per tag.

The counter is preferably of the type having an indicating handwheel which can be preset to indicate a desired total of tags, the counter being organized to return the handwheel step by step to zero setting. Thus the handwheel, rather than indicating directly the number of tags counted, indicates the difference between the number of tags counted and the desired number of tags of the batch.

The ratchet wheel 253, previously mentioned, may be secured to a hub 272 which is rotatable on the cylindrical portion of a stud 273. The stud 273 is shown as having a screw threaded outer portion 273a having threaded thereon a handwheel 275 which carries a numbered dial 276. A stationary pointer 278 cooperates with the dial in showing the setting of the handwheel.

Pins 280, Fig. 28, fast in the hub 272 of ratchet wheel 253 have a sliding fit in recesses in the handwheel 275, so that the ratchet wheel 253 and handwheel 275 turn together.

At the start of a batch of tags the handwheel 275 will be at some distance out from the casing of the counter, depending upon the number of tags for which the handwheel has been set. As the ratchet wheel 253 is advanced step by step in the counting, the handwheel will be both rotated and progressively moved inwardly toward the casing of the counter.

When the handwheel is sufficiently close to the casing of the counter and moves to the angular position corresponding to zero, a pin 284 on the handwheel strikes a follower 285 which is slidable horizontally in the casing. A pin 287 on the follower 285 and extending through the casing turns a lever 289, Fig. 24, against the action of a spring 290, for the purpose of suspending the feed of further tag sections to the counter.

Figure 30:
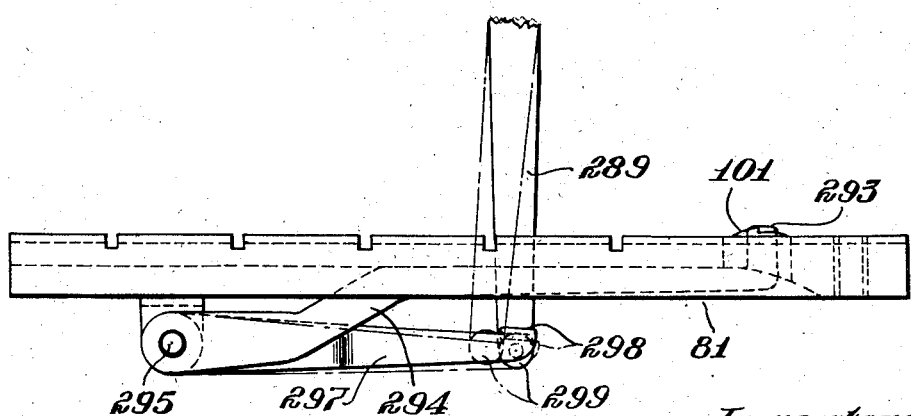
Fig. 30 is a side elevation corresponding to Fig. 29.

Referring to Fig. 30, the broken line position of lever 289 is its normal position and the full line position of this lever is the position to which it is thus moved by the above described connections when the predetermined count is attained.

The bed 81 in the region where the first pair of feed pawls 101 operate is slotted to receive a pair of upstanding fingers 293 carried by arms 294 fast on a shaft 295.

Normally the fingers 293 lie below the level where the tag feed slots 53 are engaged by the feed pawls 101.

An arm 297 fast on the shaft 295 carries a lip 298 adjacent to the normal position of the bottom of lever 289. A roller 299 extending from the bottom of lever 289 normally is free of the lip 298, but when the lever 289 is moved to the full line position of Fig. 30, as the predetermined count is attained, roller 299 moves under and slightly lifts the lip 298, thus acting through arms 297 and 294 to raise fingers 293.

Fingers 293 in their raised position hold the tag material above the first pair of feed pawls, so as to suspend their feeding action. It may be mentioned that the further feed pawls that engage tag material farther along in the machine continue to advance whatever preceding tags are engaged thereby, so that the printing and perforating stations are cleared of tags.

When the action of the first pair of feed pawls is suspended and no further tag sections reach the sensing pin 260, the action of the counter is converted from a counting of tags to a counting of cycles of operation of the machine, there being no tag material to engage the pin 260 to prevent actuation of the counter.

The ratchet wheel 253 and the handwheel 275 thus are indexed, notch by notch, beyond zero setting of the handwheel by the action of the pawl 255 at each cycle. After a predetermined number of cycles sufficient to clear tag material from all subsequent stations, for instance ten or eleven cycles, the pin 284 on the hand wheel encounters a projection 300 on a pivoted control member 301, turning this clockwise as viewed in Fig. 27. Control member 301 is provided with a cam-shaped portion 303 adapted upon such clockwise rotation of the control member to engage and depress a plunger 305, the plunger being arranged so that when so depressed, as in Fig. 27, it moves a switch 307 from the "on" to the "off" position. Movement of this switch to the "off" position acts through a circuit and mechanism subsequently described to stop the drive of the main cam shaft 88, whereupon the cyclic operation of the bed and the feeding mechanism stops and the machine remains idle.

The control member 301 also preferably serves as a manual control for the machine, and may be turned by an upstanding handle portion 301a either to cause the cam 303 to engage the plunger 305 and stop the feeding, printing and punching, or to disengage the plunger 305 and permit the machine to be started.

The machine includes provision to prevent an erroneous count from occurring as a result of depletion of the supply of tag material. Thus the machine includes means for detecting depletion of the supply and means controlled by this detecting means for suspending operation of the counter. The suspension of operation of the counter in this instance is preferably and most readily accomplished by stopping its drive, namely the cyclic motion of the bed 81 as caused by the main cam shaft 88.

Figure 29:
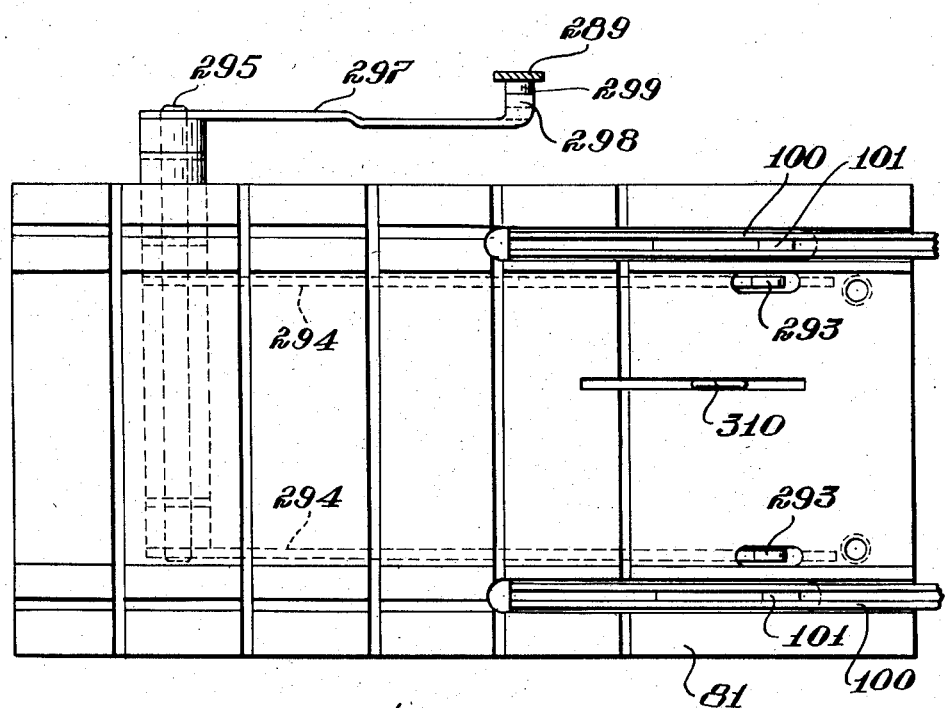
Fig. 29 is a fragmentary detail, mainly in plan, showing the left end of the bed, the first pair of feed fingers and mechanism controlled by the counter for preventing these fingers from being effective.

A detecting finger 310, Figs. 29 and 8, extends through a slot in the bed 81 near the region of operation of the first pair of feed pawls and engages at its bottom end a switch arm 311 by which it is urged upwardly. In this upper position of the finger 310 and switch arm 311 a switch 312, controlled by the arm, is in an open position.

A weight 330, slidable in the right-hand guides 91 of the magazine may be raised manually as in Fig. 5 to admit a continuous strip of tag material or a stack of pre-cut tags beneath it. When the weight is lowered, then so long as there is a single tag section between the weight and finger 310, the weight acts through this tag section to hold the finger depressed and the switch 312 closed. The weight is suitably cut out to permit the finger 310 to rise therein in the absence of a tag section between the finger and weight.

When the supply exhausts at the finger 310 and this finger rises, the switch 312 opens and opening of this switch acts through a circuit and mechanism subsequently described to stop the drive of main cam shaft 88 at the end of its cycle. The cyclic operation of the bed is thus stopped and the operation of the counter is thereby suspended.

An advantage of stopping the drive of the main cam shaft upon detection of exhaustion is that not only the cyclic operation of the bed but also the cyclic feeding motion of the feed bars are stopped, and the machine is in condition for replenishment and shows by its inaction that it requires attention. Moreover the feed of tag material past the sensing pin is stopped in time so that the last section of the last tag will not have passed beyond the sensing pin, and in fact, in the machine shown, will not have yet reached the sensing pin.

When the supply is replenished and the machine restarted the count will be resumed and continue to the production of the correct number of tags.

Figure 32:
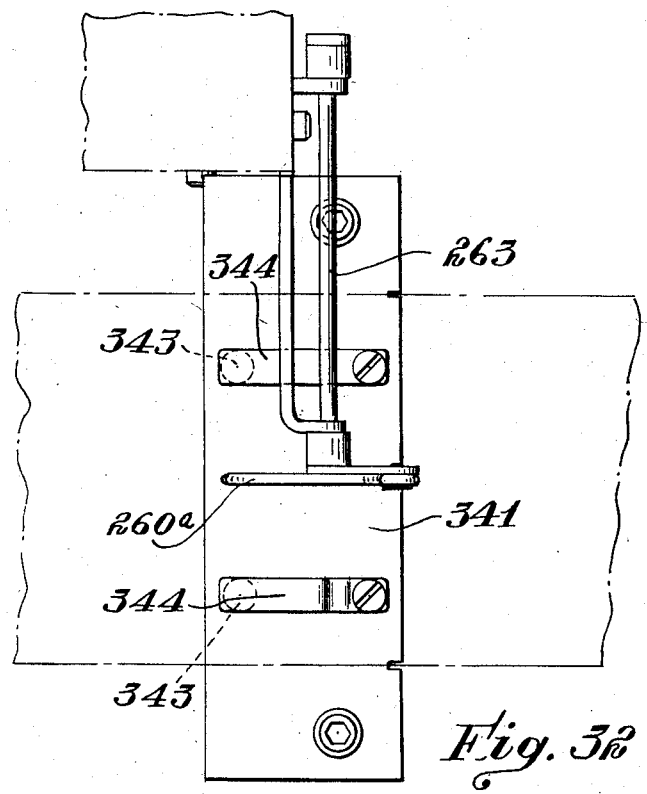
Fig. 32 is a fragmentary plan view corresponding to Fig. 31.
Figure 31:
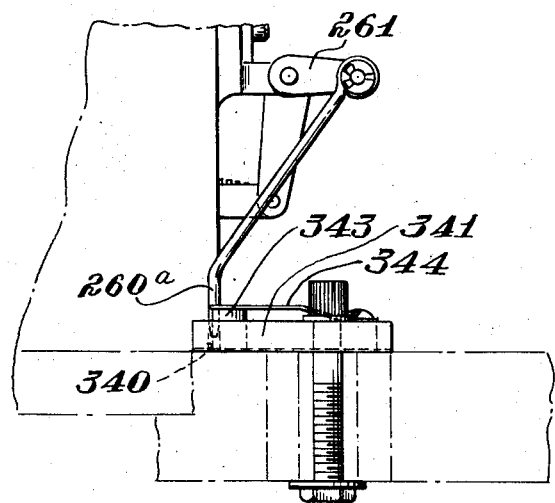
Fig. 31 is a side elevation showing particularly the sensing pin and connections thereto to the counter for controlling the counter in accordance with the structure of the tag sections presented to the pin, the pin being arranged for use in connection with pre-cut tags fed from a supply in a hopper.

When pre-cut separate tags are employed the cutting mechanism of Fig. 9 will be omitted. Figs. 31 and 32 are fragmentary views of the machine without such cutting mechanism. It will be noted that in these views the sensing pin 260a (corresponding to the sensing pin 260 of other figures of the drawings) has been bent and its bottom end shifted to the left to the extent of one tag section. In this position the pin senses a tag section which is located at one step of feed from the stack of tags. This location of the pin is advantageous in that, since the forward feeding motion takes place before the bed rises, it is thus assured that the counter will not make a false count at the start of a batch. Since feeding from the magazine is suspended at the end of the cycle in which the predetermined count is attained, this location of the pin has the further advantage that when the predetermined count is attained there is no tag left partly in and partly out of the magazine.

The operative end of pin 260a is held in the desired position by being engaged loosely in a hole 340 in a block 341 which may be of transparent material fastened to the bed so as to overlie the path of the tags, hole 340 being located at the position occupied by hole 65 of the tag. The tag material may be held down against the bed by pins 343 which have a smooth finish at their bottoms and extend through holes in the block 341 and are yieldingly urged against the tag material by light springs 344.

A similar block 341 may be employed to fix the location of the bottom of the straight sensing pin 260 of other figures of the drawings.

The main cam shaft 88 is driven through a clutch indicated generally at 350, Fig. 6, gears 351, 352 and a gear reduction unit 353 driven by an electric motor M, Fig. 5.

Clutch 350 is of the type in which the driving and driven members will remains in engagement as long as this is permitted by a controlling member which is movable into clutch-disengaging position and adapted to index the driven member of the clutch at a definite point in its rotation. In the present machine the driven member and cam shaft 88 are indexed at a point corresponding to the end of a feeding and bed-reciprocating cycle of the machine, to leave the machine stopped with its bed down. A clutch controlling member 354 is connected by a link 355 and lever 356 to the armature of a solenoid 360. A spring 361 acts through the lever 356 to urge the clutch controlling member to move to cause the clutch to disengage and index the driven cam shaft 88 when the solenoid 360 is deenergized. Energizing the solenoid 360 on the other hand permits the clutch to engage and permits the cam shaft 88 to rotate.

It has been explained above that the switch 307 brings about a stop of the cyclic motion of the machine after a number of cycles, for instance ten or eleven, following the attainment of a predetermined count, and that the switch 312 brings about an immediate stop of the cyclic motion of the machine when the supply exhausts. Various electrical circuits may be employed for controlling the clutch solenoid 360 by the switches 307 and 312. There now follows a description of a preferred circuit for this purpose having additional advantages of preventing improper starting of the machine.

*Preferred electric circuit*

Referring to the wiring diagram of Fig. 33 the electrical circuit of the machine is adapted to be plugged into a source of power by an ordinary plug connector 365. The motor M as well as the other electrical devices are controlled by a main switch 366.

The two solenoids 221 for controlling the two platens 170 are shown as controlled by their respective microswitches 220.

The clutch solenoid 360 is under the joint control of the upper contacts of a double relay 370 (adapted to be closed by an actuating coil 371) and the switch 307 (adapted to be thrown automatically to "off" position by the counter and also moved manually to either the "off" or "on" position by the handle 301a). Thus the clutch solenoid is deenergized and the camshaft 88 stopped in indexed position when the cam 303 of the counter acts to move the switch 307 to the "off" position after the predetermined count is attained and the counter has thereafter counted the necessary number of machine cycles (ten or eleven) to insure clearing the machine.

The clutch solenoid is also under the control of the switch 312 which the feeler 310 allows to open upon exhaustion of the supply. As shown, this switch 312 is in circuit with the relay actuating coil 371 of the relay 370 so that opening the switch 312 allows the relay to open both the upper and lower relay contacts, the upper such contacts controlling the clutch solenoid. Thus the clutch solenoid is deenergized and the camshaft 88 stopped in indexed position when the detector 310 detects exhaustion of tag material.

Since the relay actuating coil 371 is under the control of the switch 312, the clutch solenoid 360 cannot be actuated to start the camshaft 88 so long as the feeler 310 indicates exhaustion of tag material.

The electrical circuit is moreover interlocked in such a way that there will be a delay between the time of energization of the motor M and of the circuits which include the platen controlling solenoids 221 and their microswitches 220 and the time when the clutch solenoid 360 is energized. Thus it is assured that the clutch will not be engaged before the motor has been energized and the platen controlling mechanism put into condition for operation.

The electrical circuit is further interlocked in such a way that, whatever the reason which has caused the machine to stop, the machine cannot restart unless the operator gives a definite movement to the operating handle 301a. For example, if the current fails, or the supply of tags exhausts, the machine will not automatically restart when these conditions are corrected, and when a predetermined count is attained the machine will not automatically restart when the handwheel is reset for another batch.

Considering the case of the main circuit being deenergized, for instance by failure of the power supply, opening of the main switch 366, or unplugging the connector 365: the relay actuating coil 371 and the clutch solenoid 360 will be deenergized. When power is restored to the main circuit, if the switch 307 has been left in the "on" position the relay actuating coil 371 is not able to act, and the clutch solenoid 360 will remain deenergized. However, with the switch 307 thrown to the "off" position, and with the switch 312 in the closed position, the relay actuating coil 371 is enabled to close the relay 370, but the clutch 360 will still remain deenergized until the switch 307 is manually thrown to the "on" position. Thus after power has been restored to the main circuit and the motor M and platen controlling mechanisms have been rendered effective, the switch 307 must be in the "off"

position and the operator must manually move this switch from the "off" to the "on" position, in order to actuate the clutch solenoid 360.

The relay actuating coil 371 in addition to serving to close the relay 370, also serves, when the lower relay contacts are closed, as a holding coil to hold the relay closed when switch 307 is moved from the "off" position.

If the supply of tag material is exhausted and the switch 312 is accordingly open, the relay actuating coil 371 is deenergized, the relay 370 is open, and the clutch 360 is deenergized. It will be apparent that the clutch solenoid cannot be reenergized so long as the feeler 310 indicates exhaustion of the tag material and leaves the switch 312 open.

Replenishing the supply of tag material and thus closing the switch 312 will still leave relay actuating coil 371 deenergized so long as switch 307 remains in the "on" position. The operator must then throw the switch 307 manually to the "off" position, permitting the relay actuating coil 371 to close the relay, and then to the "on" position permitting the clutch solenoid 360 to be energized. The machine therefore will not restart merely as a result of replenishment of an exhausted supply. As indicated above, energization of the clutch solenoid 360 is also contingent upon the main circuit being previously energized. It will be understood that the switch 312 may close while the operator is engaged in replenishing the supply but has not finished this operation. It would be undesirable for the machine to start up during this time, unexpectedly, for instance while the magazine was being filled and the weight 330 was removed. Such premature or unintentional start is prevented by the provisions just described.

With the machine running normally, the operation may at any time be suspended by the operator manually throwing the switch 307 to the "off" position and then restarted by throwing switch 307 back to the "on" position.

Switch 307 is automatically thrown to the "off" position by the cam 303 after the predetermined count has been attained and the machine cleared of tags. The handwheel 275 may then be reset for the desired number of tags of the next batch, but this does not restart the machine but leaves the switch 307 in the "off" position and the clutch solenoid 360 deenergized. For the machine to be restarted, a supply of tag material must be present, so that the relay 370 will be closed, and the operator must manually throw switch 307 to the "on" position so that the clutch solenoid 360 can be energized through the relay.

We claim:

1. In a cyclically operating machine for operating sequentially upon successive sections of sectional tag material having sections of two different types of which one type has a preformed hole at a given location therein and the other type lacks a corresponding hole, the combination of: means for holding a stack of sectional tags, means for feeding the tags, in steps from the stack and to a place to be operated on, a settable counter, means controlled by said counter for stopping said feeding from the stack, sensing means for distinguishing between the presence and absence of such preformed hole in a section, and means whereby the sensing means controls the actuation of the counter to permit actuation thereof in case of presentation to the sensing means of a tag section having such hole and present such actuation in case of presentation to the sensing means of a tag section lacking such hole, said sensing means being positioned to sense a tag section when such tag section is located one step of feed removed from the stack of tags.

2. In a cyclically operating machine for operating sequentially upon successive sections of sectional tag material having sections of two different types with different structural characteristics, the combination of: indicia-applying means including a cyclically moving element, means for feeding the tag material section-by-section from a supply in timed relation to the movement of said element, a settable counter, means tending to actuate the counter in timed relation to the movement of said element, sensing means for distinguishing between one type of tag section or absence of a tag section on the one hand and the other type of tag section on the other hand, means whereby the sensing means controls the actuation of the counter to prevent actuation thereof in case of presentation to the sensing means of said other type of tag section, means controlled by the counter upon attaining a predetermined count, for suspending the feeding of tag material from the supply, and means controlled by further actuation of the counter after such suspension of feeding for stopping the cyclic movement of said element.

3. In a machine for applying indicia to successive sections of sectional tag material in which one section of each tag has a preformed hole, the combination of: indicia-applying means including a cyclically moving element, means for advancing the tag material section-by-section from a supply to and past the indicia-applying means, a settable counter, means tending to actuate the counter in timed relation with the cyclic movement of said element, sensing means between the supply and the indicia-applying means, said sensing means being responsive to tag material of sections lacking such preformed hole as distinguished from sections having such preformed hole and from absence of tag sections, means whereby the sensing means controls actuation of the counter to prevent such actuation in the event of presentation to the sensing means of material of a tag section lacking such preformed hole, means controlled by the counter for suspending advance of tag sections from the supply to the sensing means upon a predetermined count while allowing said cyclic movement of said element of the indicia-applying means and the advance of material past the indicia-applying means to continue, whereby after such suspension of advance of sections from the supply to the sensing means the counter counts in timed relation with said cyclic movement, and means controlled by the counter for stopping said cyclic movement after a predetermined count following such suspension of advance from the supply.

4. In a machine for applying indicia to successive sections of sectional tag material in which one section of each tag has a preformed hole, the combination of: indicia-applying means, reciprocating tag feed mechanism arranged to advance tag material section-by-section from a supply to and past the indicia-applying means, said feed mechanism moving cyclically in timed relation with the indicia-applying means, a settable counter, means tending to operate the counter in timed relation with the cyclic movement of the feed mechanism, sensing means between the supply and the indicia-applying means, said sensing means being responsive to tag material of sections lacking such a preformed hole as distinguished from sections having such preformed hole and from absence of tag sections, means whereby the sensing means controls actuation of the counter to prevent such actuation in the event of presentation to the sensing means of material of a tag section lacking such preformed hole, means controlled by the counter and effective upon a predetermined count for stopping reception of tag material by the feed mechanism while allowing the cyclic movement of the feed mechanism to continue, whereby after such prevention of reception of tag material by the feed mechanism the counter counts in timed relation with the cyclic movement of said feed mechanism, and means controlled by the counter for stopping said cyclic movement after a predetermined count following such stopping of reception of tag material by the feed mechanism.

5. In a cyclically operating machine for operating sequentially upon successive sections of sectional tag material having sections of two different types which differ in that sensible material is present at a given region in one type but absent from this region in the other type, the combination of a plurality of indicia-applying devices, means for feeding a procession of tag sections step by step from a supply to and past the indicia-applying devices, sensing means for distinguishing between the presence and absence of sensible material thereat at each step of feed, a settable counter, means controlled by the counter attaining a predetermined count for terminating operative engagement of the supply and the feeding means at the end of a run, means for re-establishing operative engagement of the supply and the feeding means for beginning a run, and means whereby the sensing means controls the actuation of the counter to permit actuation thereof in case of presentation to the sensing means of a tag section of one said type and prevent such actuation in case of presentation to the sensing means of a tag section of the other said type, said sensing means being positioned to sense in advance of the first indicia-applying device, within a zone reached by a tag section in receiving one step of feed after re-establishment of said operative engagement of the supply and the feeding means.

6. A machine as claimed in claim 5 including means for holding a supply in the form of a stack of pre-cut tags, the feeding means extending under the stack, and the sensing means being located outside of the stack in a plate attained by a tag section upon one step of feed imparted thereto by the feeding means.

7. A machine as claimed in claim 5 including means for severing multiple section tags from a longer strip, and the sensing means being located beyond the severing means and within one step of feed from the line of action thereof.

8. A machine as claimed in claim 5 including means tending to actuate the counter for each step of feed, and means controlled by further actuation of the counter following termination of operative engagement of the supply and the feeding means, for stopping the feeding means.

References Cited in the file of this patent

UNITED STATES PATENTS

| | | |
|---|---|---|
| 1,496,358 | Pailthorpe | June 3, 1924 |
| 1,763,067 | Schaaff | June 10, 1930 |
| 2,708,873 | Braun | May 24, 1955 |

OTHER REFERENCES

Gift-Potter Instrument Co., July 7, 1949 (7 pages).
Counting Timing and Recording Devices, November 17, 1949 (8 pages).